US012066014B2

(12) United States Patent
Vaudolon et al.

(10) Patent No.: US 12,066,014 B2
(45) Date of Patent: Aug. 20, 2024

(54) CHAMBER BOTTOM FOR A PLASMA THRUSTER

(71) Applicant: SAFRAN AIRCRAFT ENGINES, Paris (FR)

(72) Inventors: Julien Pierre Alain Vaudolon, Moissy-Cramayel (FR); Dominique Jean Etienne Indersie, Moissy-Cramayel (FR); Laurent Alexandre René Godard, Moissy-Cramayel (FR); Tiphaine De Tinguy, Moissy-Cramayel (FR); Fabrice François Julien Mayeul, Moissy-Cramayel (FR); Romain Vallat, Moissy-Cramayel (FR)

(73) Assignee: SAFRAN SPACECRAFT PROPULSION, Vernon (FR)

( * ) Notice: Subject to any disclaimer, the term of this patent is extended or adjusted under 35 U.S.C. 154(b) by 324 days.

(21) Appl. No.: 17/439,097

(22) PCT Filed: Mar. 11, 2020

(86) PCT No.: PCT/FR2020/050501
§ 371 (c)(1),
(2) Date: Sep. 14, 2021

(87) PCT Pub. No.: WO2020/188185
PCT Pub. Date: Sep. 24, 2020

(65) Prior Publication Data

US 2022/0145865 A1 May 12, 2022

(30) Foreign Application Priority Data

Mar. 15, 2019 (FR) ....................................... 1902712

(51) Int. Cl.
*F03H 1/00* (2006.01)

(52) U.S. Cl.
CPC ......... *F03H 1/0031* (2013.01); *F03H 1/0075* (2013.01)

(58) Field of Classification Search
CPC ..................................................... F03H 1/0075
See application file for complete search history.

(56) References Cited

U.S. PATENT DOCUMENTS

| | | | | |
|---|---|---|---|---|
| 6,431,909 B1 * | 8/2002 | Nolden | ................ | H01R 9/2608 361/810 |
| 11,346,330 B1 * | 5/2022 | Xu | ........................ | F03H 1/0075 |

FOREIGN PATENT DOCUMENTS

| | | |
|---|---|---|
| CN | 102630277 A | 8/2012 |
| CN | 103410694 A | 11/2013 |

(Continued)

OTHER PUBLICATIONS

Bayer "Snap-Fit Joints for Plastics—A Design Guide" (Year: 2012).*

(Continued)

*Primary Examiner* — Arun Goyal
*Assistant Examiner* — William L Breazeal
(74) *Attorney, Agent, or Firm* — Bookoff McAndrews, PLLC

(57) ABSTRACT

Chamber bottom for a plasma thruster making it possible to combine several functions in a single piece and, in particular, to fasten certain insulating parts of the plasma thruster, the chamber bottom having, in a single piece, a chamber bottom surface for closing an annular chamber formed by the chamber bottom and at least one insulating part attached to the chamber bottom, and at least a first set of tabs including fastening tabs for fastening the at least one insulating part to the chamber bottom.

9 Claims, 7 Drawing Sheets

(56) References Cited

FOREIGN PATENT DOCUMENTS

| | | | |
|---|---|---|---|
| CN | 105003409 | A | 10/2015 |
| CN | 108799032 | A | 11/2018 |
| FR | 2962061 | A1 | 1/2012 |
| FR | 3018316 | A1 | 9/2015 |

OTHER PUBLICATIONS

First Office Action issued in the corresponding Chinese Application No. 2020800212691, mailed on May 11, 2023.
International Search Report in International Application No. PCT/FR2020/050501, mailed Sep. 14, 2020, with English translation (4 pages).
Written Opinion in International Application No. PCT/FR2020/050501, mailed Sep. 14, 2020 (5 pages).
French Search Report in French Application No. 1902712, dated Dec. 12, 2019.

* cited by examiner

[Fig. 1]
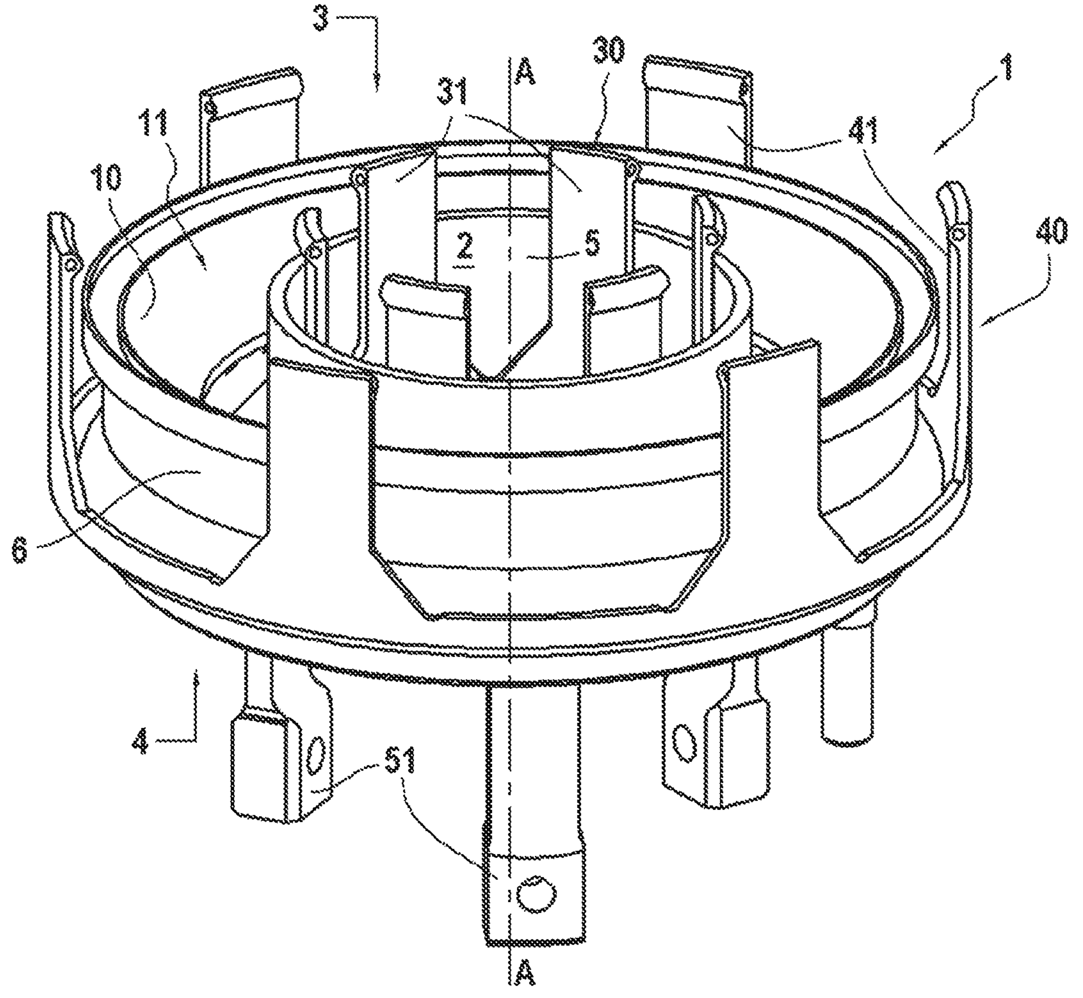

[Fig. 2]
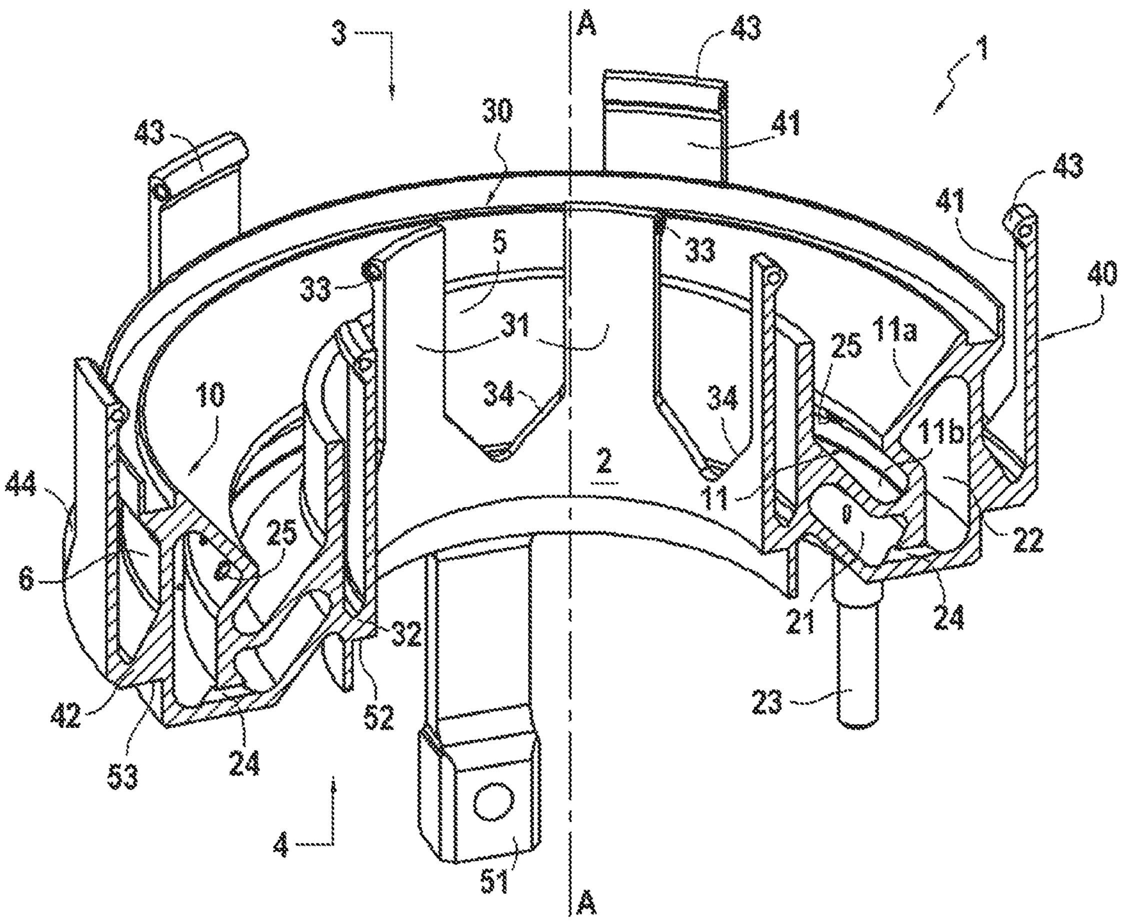

[Fig. 3]
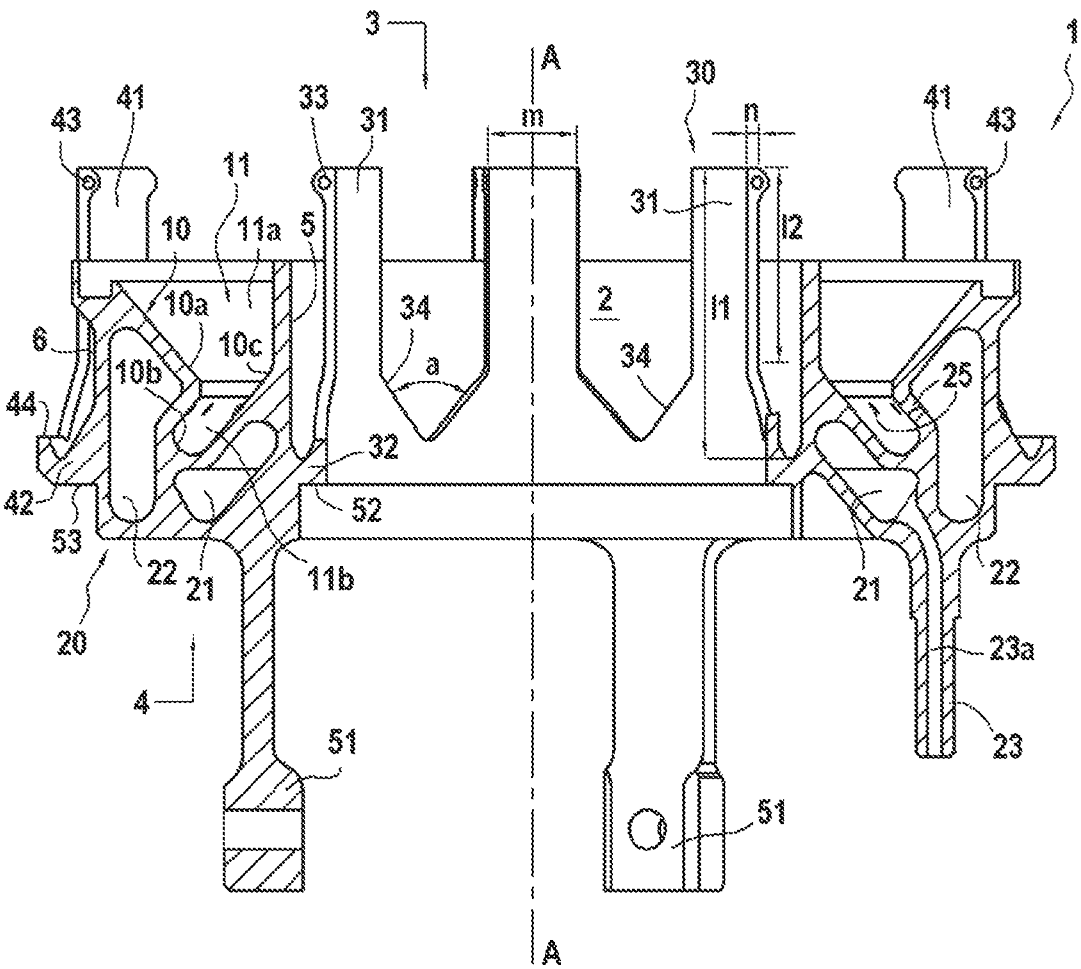

[Fig. 4]
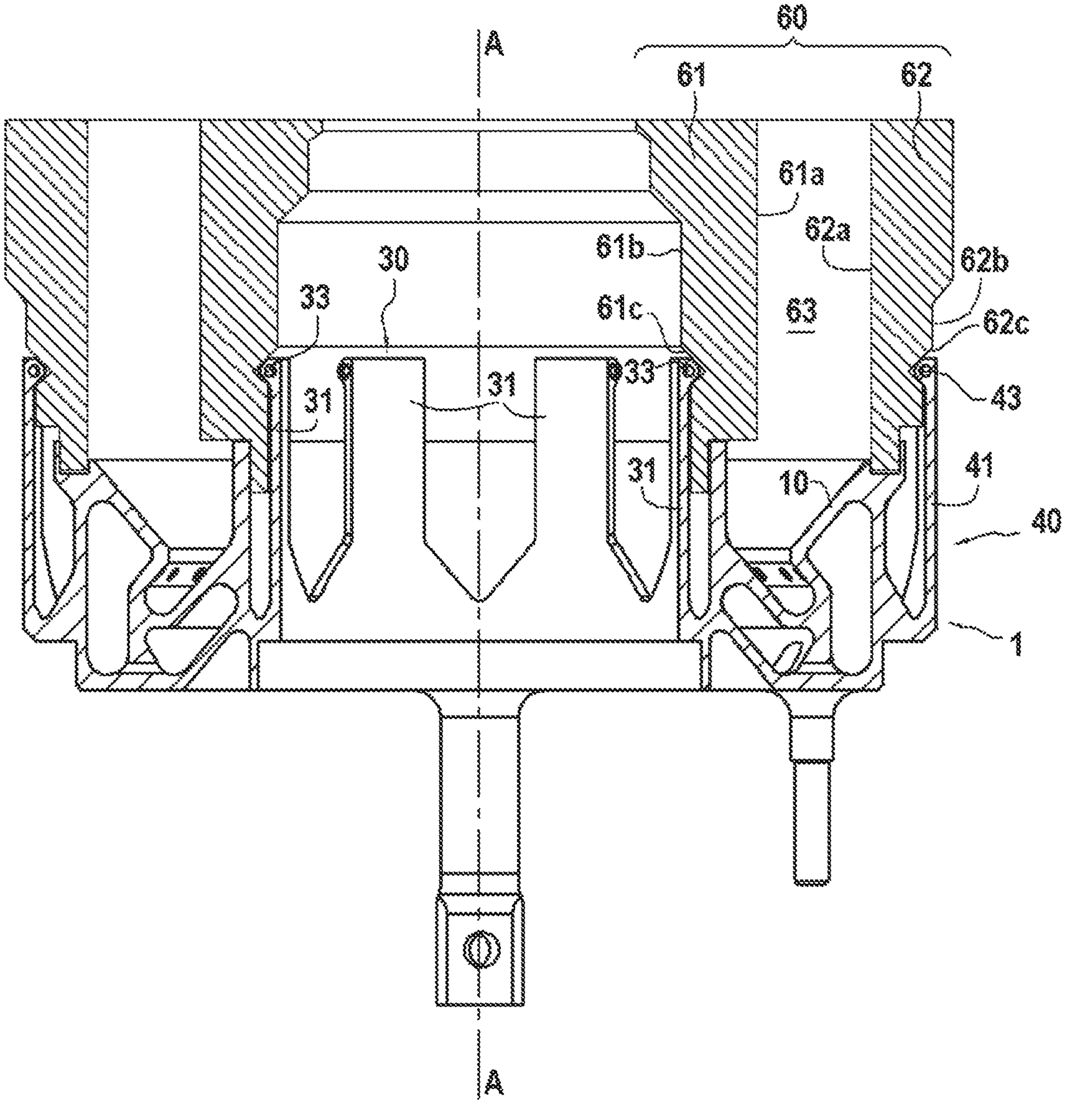

[Fig. 5]
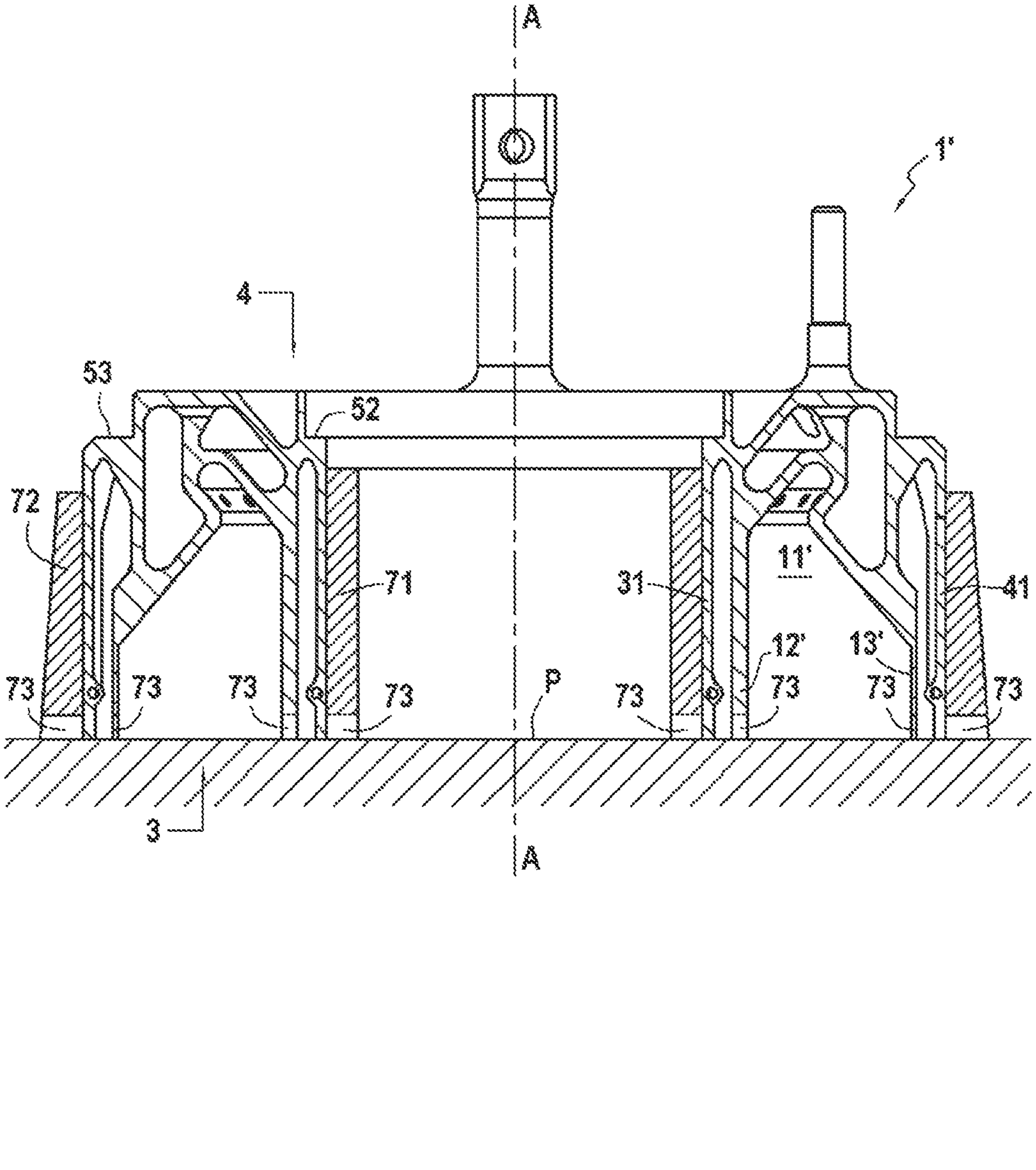

[Fig. 6]
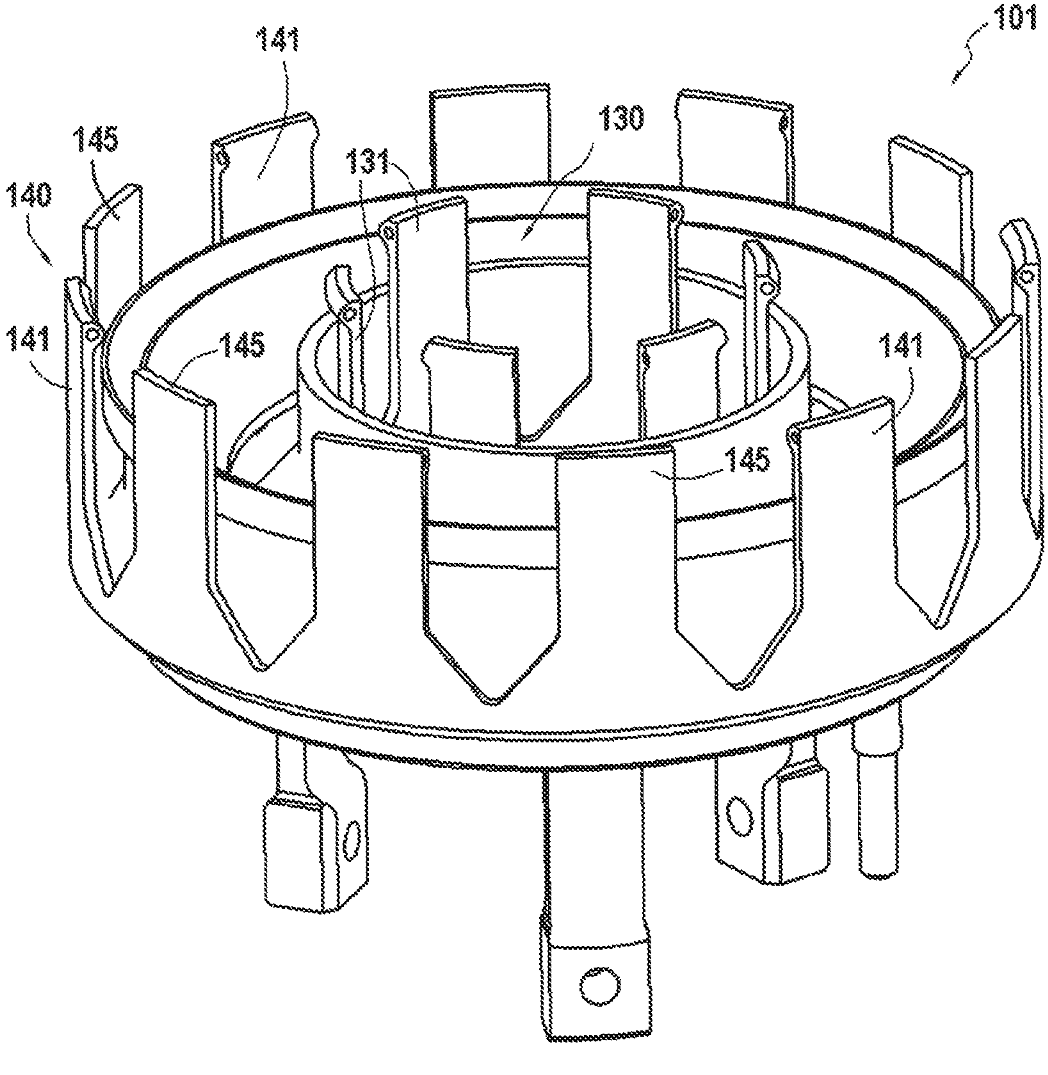

[Fig. 7]
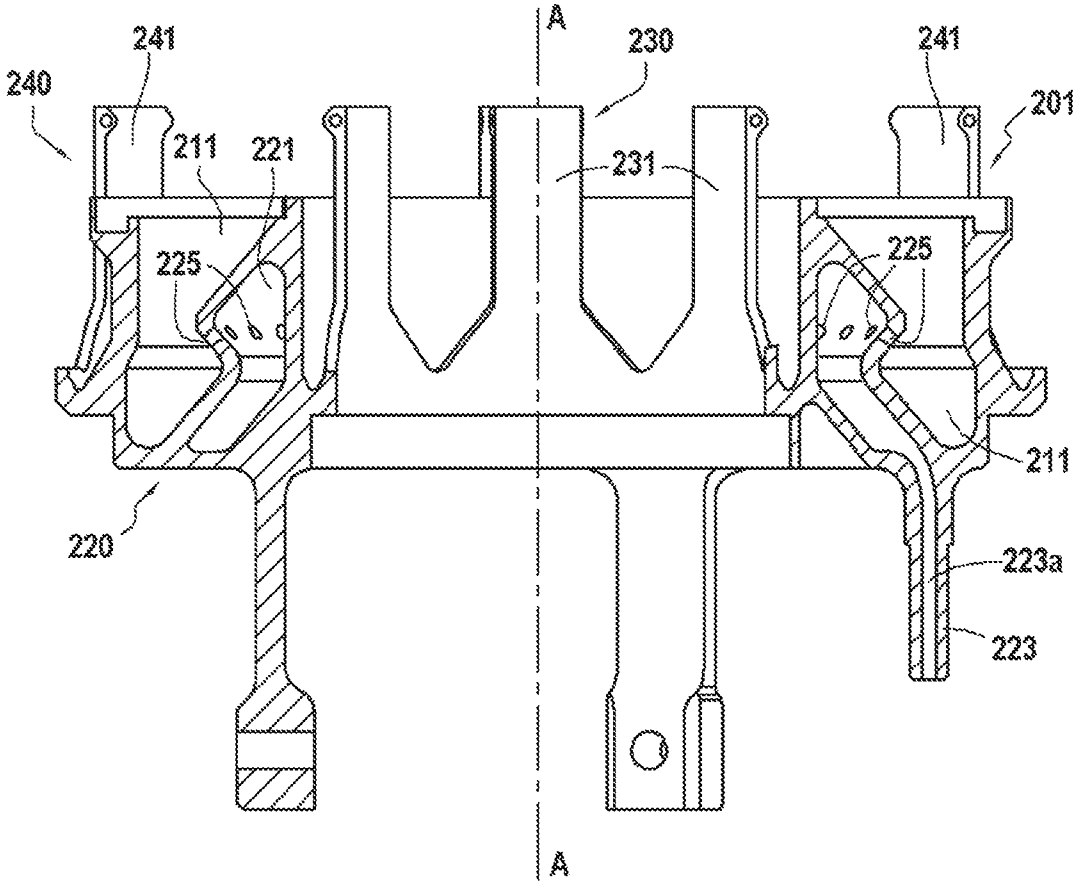

CHAMBER BOTTOM FOR A PLASMA THRUSTER

CROSS-REFERENCE TO RELATED APPLICATIONS

This application is the U.S. national phase entry under 35 U.S.C. § 371 of International Application No. PCT/FR2020/050501, filed on Mar. 11, 2020, which claims priority to French Patent Application No. 1902712, filed on Mar. 15, 2019.

TECHNICAL FIELD

The present disclosure relates to a chamber bottom for a plasma thruster making it possible to combine several functions in a single piece and, in particular, to fasten certain insulating parts of the plasma thruster.

Such a chamber bottom can be used for plasma thrusters of different types, and in particular Hall effect thrusters. Such thrusters can in particular be used in the space field to propel or control the attitude of a space vehicle such as a satellite.

BACKGROUND

Hall effect thrusters conventionally comprise a discharge chamber having ceramic insulating walls and an anode-injector assembly disposed at the chamber bottom; an electron gun, forming the cathode, is in turn mounted on the side of the discharge chamber and projects electrons into the space located in front of said chamber so as to initiate a discharge with the anode, thus forming a plasma in the discharge chamber.

Conventionally, the discharge chamber is formed using an annular ceramic part having a U-shaped sectional profile; the mechanically welded anode-injector assembly, is then attached to the bottom of the discharge chamber, most often by gluing or clamping.

The many difficulties that such configurations of the prior art have are thus understood. Primarily, such discharge chambers require the manufacture, machining and assembly of several separate parts including a ceramic part, an anode and an injector. These operations therefore prove to be particularly expensive, in particular when the rates of the space sector are considered.

There is therefore a real need for a chamber bottom and a plasma thruster which are devoid, at least partly, of the drawbacks inherent in the aforementioned known configurations.

DISCLOSURE OF THE INVENTION

The present disclosure relates to a chamber bottom for a plasma thruster, comprising, in a single piece,

- a chamber bottom surface for closing an annular chamber formed by the chamber bottom and at least one insulating part attached to the chamber bottom, and
- at least a first set of tabs comprising fastening tabs for fastening said at least one insulating part to the chamber bottom.

Thus, thanks to such a configuration, it is possible to bring together in a single integral part, several functions performed by different parts until now. In particular, this single part closes the discharge chamber at its lower end and fastens the insulating part by elastic fitting.

In addition, thanks to such fastening tabs, formed in a single piece with the chamber bottom surface, it is possible to attach the insulating part extremely quickly, easily and reliably: no technical operation of gluing or of welding is necessary, no preparation or drying time is necessary, and the risk of assembly failure is extremely reduced.

Therefore, the configuration of this chamber bottom makes it possible to reduce manufacturing costs and speed up production rates.

In some embodiments, the chamber bottom is made of an electrically conductive material. It is thus possible to add the anode function to the chamber bottom, further reducing the number of parts necessary for the operation of the thruster.

In some embodiments, the chamber bottom is made of a metallic material.

In some embodiments, the chamber bottom is produced by additive manufacturing. Such a manufacturing technique makes it possible to produce the chamber bottom in a single piece with great freedom of geometry, which makes it possible to integrate more functions on the same part and to optimize, in particular, the distribution of the propellant gas in the chamber bottom.

In some embodiments, the chamber bottom surface is open on the upper face of the chamber bottom.

In some embodiments, the chamber bottom surface is annular, preferably rotationally symmetrical.

In some embodiments, the chamber bottom surface has in section a generally U-shaped profile. The term "general U-shape" is understood to mean any shape having two ends substantially at the same level and a hollow of any shape, with a minimum, spread or not, between the two ends. In particular, it is intended to encompass the shapes in V.

In some embodiments, the sectional profile of the chamber bottom surface has at least one point of inflection, preferably at least two points of inflection. In other words, the profile of the chamber bottom surface is not regular: it may comprise one or more bumps or even form constrictions and/or enlargements. Such geometries can be used to optimize the flow of the propellant gas in the discharge chamber.

In some embodiments, the chamber bottom comprises a first inner set of tabs, comprising fastening tabs for fastening a first insulating part to the chamber bottom, and a second outer set of tabs, comprising fastening tabs for fastening a second insulating part to the chamber bottom. In such embodiments, two separate insulating parts respectively form the inner and outer walls of the discharge chamber. The geometry of each of the insulating parts is thus simplified compared to the case of an annular part provided with an annular cavity, which facilitates the production of these parts, especially when they are made of ceramic.

In some embodiments, at least one set of tabs, preferably each set of tabs, is disposed in a crown. The tabs are preferably distributed evenly within each crown.

In some embodiments, the inner set of tabs comprises between 4 and 8 fastening tabs.

In some embodiments, the outer set of tabs comprises between 4 and 16 fastening tabs, preferably between 4 and 8 fastening tabs. Such a number of tabs makes it possible to effectively hold the insulating part against the chamber bottom while preserving a certain flexibility making it possible to dissipate any shocks and vibrations, which reduces the risk of breaking the insulating part during operation.

In some embodiments, the outer set of tabs comprises the same number of fastening tabs as the inner set of tabs.

In other embodiments, the outer set of tabs comprises twice as many fastening tabs as the inner set of tabs.

In some embodiments, at least one fastening tab, preferably each fastening tab of one or each set of tabs, extends axially, substantially perpendicularly to the chamber bottom, beyond the chamber bottom surface.

In some embodiments, at least one fastening tab, preferably each fastening tab of one or each set of tabs, has a length comprised between 1 and 30 mm, preferably between 10 and 25 mm.

In some embodiments, at least one fastening tab, preferably each fastening tab of one or each set of tabs, has a width comprised between 1 and 220 mm, preferably between 1 and 55 mm.

In some embodiments, at least one fastening tab, preferably each fastening tab of one or each set of tabs, extends over an angular sector comprised between 1 and 180°, preferably between 1 and 45°.

In some embodiments, at least one fastening tab, preferably each fastening tab of one or each set of tabs, has a thickness comprised between 0.1 and 5 mm.

In some embodiments, at least one fastening tab, preferably each fastening tab of one or each set of tabs, has a Young's modulus comprised between 50 and 300 GPa. These settings allow to adjust the elasticity of the fastening tabs. The purpose is to remain in the elastic range of the tabs at all times, without entering the plastic range, neither during assembly nor in operation.

In some embodiments, at least one fastening tab, preferably each fastening tab of one or each set of tabs, has at its distal end a protrusion configured to cooperate with a notch, a groove or a shoulder of an insulating part.

In some embodiments, at least one set of tabs comprises dummy tabs configured so as not to cooperate with said at least one insulating part. These tabs can be useful during additive manufacturing because they make it possible to reduce the distance between two successive tabs, and therefore the angle of the arch formed between these two successive tabs, which makes it possible to reduce the need for temporary supports during additive manufacturing. These dummy tabs do not participate in the fastening of the insulating parts, they can be partially or totally machined after manufacture to prevent them from rubbing on the insulating parts and wearing them out.

In some embodiments, the inner set of tabs comprises between 0 and 4 dummy tabs.

In some embodiments, the outer set of tabs comprises between 4 and 8 dummy tabs.

In some embodiments, at least some of the tabs, and preferably all the tabs of one or each set of tabs, are joined together by an arch whose apex angle is less than 90°. This makes it possible to reduce the need for temporary supports during additive manufacturing.

In some embodiments, the chamber bottom further comprises at least one distribution cavity communicating with the chamber thanks to injection orifices opening onto the chamber bottom surface. This makes it possible to add the function of an injector to the chamber bottom, further reducing the number of parts required for the operation of the thruster.

In some embodiments, the chamber bottom comprises a first distribution cavity communicating with a second distribution cavity via a first series of injection orifices, the second distribution cavity communicating with the chamber via a second series of injection orifices. These two successive distribution cavities improve the distribution of the propellant gas at 360°.

In some embodiments, at least one distribution cavity, preferably each distribution cavity, is annular, preferably rotationally symmetrical.

In some embodiments, at least one injection orifice, preferably at least 50% of the injection orifices, more preferably each injection orifice, has a diameter greater than or equal to 0.7 mm, preferably greater than or equal to 1 mm. Such a diameter allows good injection of the propellant gas as well as good dust removal from the distribution cavities at the end of additive manufacturing.

In some embodiments, at least one injection orifice, preferably at least 50% of the injection orifices, more preferably each injection orifice, has a diameter less than or equal to 4 mm, preferably less than or equal to 1.5 mm.

In some embodiments, all the injection orifices have the same diameter.

In some embodiments, the chamber bottom comprises an injection funnel extending from the lower face of the chamber bottom and provided with an injection channel making it possible to inject a fluid into said at least one distribution cavity. This injection funnel supplies the discharge chamber with propellant gas. It can also be used as an electrical connector to bring the chamber bottom to the anode potential.

In some embodiments, the chamber bottom further comprises at least one fastening lug, and preferably several fastening lugs, extending from the lower face of the chamber bottom, making it possible to fasten the chamber bottom to a thruster body.

In some embodiments, the chamber bottom comprises at least one axisymmetric shoulder, provided on the lower face of the chamber bottom. This shoulder can form a reference surface for installing the chamber bottom on a machining tool. In particular, the chamber bottom may comprise a first shoulder located on the inner edge of its lower face and a second shoulder located on the outer edge of its lower face.

The present disclosure also relates to a plasma thruster, comprising a chamber bottom according to any one of the preceding embodiments, and at least one insulating part fastened to the chamber bottom using at least the first set of tabs.

In some embodiments, the plasma thruster comprises a first radially inner insulating part forming a radially inner wall of the chamber, and a second radially outer insulating part forming a radially outer wall of the chamber. As indicated above, the geometry of each of the insulating parts is thus simplified compared to the case of an annular part provided with an annular cavity, which facilitates the production of these parts, especially when they are made of ceramic.

In some embodiments, at least one insulating part, and preferably each insulating part, takes the shape of a cylindrical ring.

In some embodiments, at least one insulating part, and preferably each insulating part, is made of a ceramic material.

In some embodiments, at least one insulating part, and preferably each insulating part, has an annular groove provided to cooperate with the fastening tabs of the chamber bottom.

In some embodiments, at least one insulating part, and preferably each insulating part, is pressed against the chamber bottom. Thus, this ensures a sealing between the chamber bottom and the insulating parts, thus reducing the risk of propellant gas leakage.

In other embodiments, a small space is left between at least one insulating part, preferably each insulating part, and the chamber bottom. In this way, the insulating parts are held in suspension above the chamber bottom by the tabs. This attachment method makes it possible to better resist mechanical stresses, in particular vibrations and shocks. In such a case, a sealing structure can be constructed or added to the interface between the insulating part and the chamber bottom; it may in particular be a seal or a labyrinth.

In the present disclosure, the terms “axial”, “radial”, “tangential”, “inner”, “outer” and their derivatives are defined relative to the main axis of the chamber bottom; the term “axial plane” means a plane passing through this main axis of the turbomachine and the term “radial plane” means a plane perpendicular to this main axis.

In the present description, “elastic fitting” (also frequently called “snap-fitting” or “clipping”) means a method for assembling two portions by engagement and elastic deformation (generally local deformation of only one portion of a part, for example of a tab, or of a peripheral element of said part, or by deformation of all the parts involved in the assembly). When the two portions are engaged in the fitting position, the portions have generally returned to their original shape and no longer have elastic deformation (or less elastic deformation). When the two portions are engaged with each other in the fitting position, they cooperate with each other so as to oppose, or even block, the relative movements of said portions in the direction of disengagement (direction opposite to the direction of engagement). In the fitting position, the two portions can further cooperate so as to oppose, or even block, their relative movements in the direction of extension of the engagement, beyond the fitting position.

The aforementioned features and advantages, as well as others, will become apparent upon reading the following detailed description of embodiments of the proposed chamber bottom and plasma thruster. This detailed description refers to the appended drawings.

BRIEF DESCRIPTION OF THE DRAWINGS

The appended drawings are schematic and are intended above all to illustrate the principles of the disclosure.

In these drawings, from one figure to another, identical elements (or portions of elements) are identified by the same reference signs. Furthermore, elements (or portions of elements) belonging to different exemplary embodiments but having a similar function are identified in the figures by numerical references incremented by 100, 200, etc.

FIG. 1 is a perspective view of a first example of a chamber bottom.

FIG. 2 is a perspective and sectional view of the first example.

FIG. 3 is a sectional view of the first example according to another sectional plane.

FIG. 4 is a sectional view of the chamber bottom equipped with insulating parts.

FIG. 5 is a sectional view illustrating the manufacture of the first example.

FIG. 6 is a perspective view of a second example of a chamber bottom.

FIG. 7 is a sectional view of a third example of a chamber bottom.

DESCRIPTION OF EMBODIMENTS

In order to make the description more concrete, examples of chamber bottoms are described in detail below, with reference to the appended drawings. It is recalled that the invention is not limited to these examples.

FIG. 1 represents a first example of a chamber bottom 1 for a plasma thruster. This same chamber bottom 1 is shown in axial section, along two different section planes, in FIGS. 2 and 3. This chamber bottom 1 is circular, of main axis A, forming a central passage 2. Most of its features are axisymmetric relative to this main axis A.

The chamber bottom 1 comprises a chamber bottom surface 10 which is invariant by rotation about the axis A and having in axial section a profile having a general U-shape within the meaning of the present disclosure. The chamber bottom surface 10, opening upwards on the upper face 3 of the chamber bottom 1, thus forms a chamber bottom cavity 11 which is open on the upper face 3.

The surface profile of the chamber bottom 10 is irregular: its outer, descending portion, includes a convex segment **10*a* followed by a concave segment 10*b* while its inner, rising portion is more regular, however with a change of slope 10*c*. The chamber bottom cavity 11 thus has a first funnel-shaped upper portion 11*a*, and a second lower portion 11*b***, forming a fold.

The chamber bottom 1 also comprises an injector 20 including here a first distribution cavity 21 and a second distribution cavity 22. An injection funnel 23 extends from the lower face 4 of the chamber bottom 1: it is provided with a central injection channel **23*a* making it possible to introduce a propellant gas into the first distribution cavity 21. The first distribution cavity 21 is connected to the second distribution cavity 22 using a plurality of first injection orifices 24 distributed in a regular manner along the circumference of the first distribution cavity 21. The second distribution cavity 22 is in turn connected to the bottom cavity of the chamber 11 by means of a plurality of second injection orifices 25 distributed evenly along the circumference of the second distribution cavity 22. The second injection orifices 25 open into the folded portion 11*b* of the chamber bottom cavity 11**.

In the present example, the chamber bottom 1 comprises 10 first injection orifices 24 and 30 second injection orifices 25; the diameter of the injection orifices 24, 25 is equal to 1 mm.

The chamber bottom 1 also comprises a first set of tabs 30 and a second set of tabs 40.

The first set of tabs 30 comprises a plurality of first fastening tabs 31 disposed in a ring uniformly along the inner circumference of the chamber bottom 1. Each fastening tab 31 extends rectilinearly upwards from a circular base 32 protruding within the passage 2, at a level closer to the lower face 4 than to the upper face 3. Each fastening tab 31 thus extends within the passage 2, along the inner surface 5 of the chamber bottom 1, before protruding on the upper face 3.

The end of each fastening tab 31 is provided with a protrusion 33 directed radially outwards. Each tab 31 is connected to its neighbors by arches 34 whose apex angle a is less than 60°, in this case equal to 40°.

In the present example, each tab 31 has a length 11 of 29 mm measured from the base 32 and a length 12 of 24 mm measured from the start of the arches 34; each tab 31 has a width m of 16.5 mm and a thickness n of 1 mm.

In the present example, the first set of tabs 30 comprises 6 fastening tabs 31.

The second set of tabs 40 comprises a plurality of second fastening tabs 41 disposed in a ring uniformly along the outer circumference of the chamber bottom 1. Each fastening tab 41 extends rectilinearly upwards from a circular base 42 protruding from the outer surface 6 of the chamber bottom 1, at a level closer to the lower face 4 than to the upper face 3, in this case at the same level as the base 32 of the first set of tabs 30. Each fastening tab 41 thus extends along the outer surface 6 of the chamber bottom 1, before protruding on the upper face 3.

The end of each fastening tab 41 is provided with a protrusion 43 directed radially inward. Each tab 41 is connected to its neighbors by arches 44.

In the present example, each tab 41 has a geometry similar to that of the tabs 31 of the first set of tabs 30 with, in particular, identical lengths, widths and thicknesses.

In the present example, the second set of tabs 40 comprises 6 fastening tabs 41.

Moreover, the chamber bottom 1 also comprises fastening lugs 51 extending axially from the lower face 4; it also comprises an inner shoulder 52, rotationally symmetrical, provided on the inner edge between the lower face 4 and the inner surface 5, and an outer shoulder 53, rotationally symmetrical, provided on the outer edge between the lower face 4 and the outer surface 6.

The assembly of the chamber bottom 1 with the insulating parts 60 will now be described with reference to FIG. 4.

These insulating parts 60, made of ceramic material, comprise a first inner insulating ring 61, and a second outer insulating ring 62. These two insulating rings 61, 62 are invariant by rotation about the axis A.

The inner insulating ring 61 has an outer surface 61*a*, which is smooth and rectilinear in the axial direction, and an inner surface 61*b* provided with a circular groove 61*c*. The outer insulating ring 62 has, in turn, an inner surface 62*a*, which is smooth and rectilinear in the axial direction, and an outer surface 62*b* provided with a circular groove 62*c*.

The inner insulating ring 61 is attached to the chamber bottom 1 by engaging its inner surface 61*b* around the tabs 31 of the first set of tabs 30, the latter then deforming elastically inward, and by pushing the ring 61 up to the stop against the upper face 3 of the chamber bottom 1: the protrusions 33 of the fastening tabs 31 then engage in the groove 61*c* of the inner ring 61 and block the position of the inner ring 61 by elastic release of the tabs 31.

Similarly, the outer insulating ring 62 is attached to the chamber bottom 1 by engaging its outer surface 62*b* around the tabs 41 of the first set of tabs 30, the latter then deforming elastically outwardly, and by pushing the ring 62 up to the stop against the upper face 3 of the chamber bottom 1: the protrusions 43 of the fastening tabs 41 then engage in the groove 62*c* of the outer ring 62 and block the position of the outer ring 62 by elastic release of the tabs 31.

Thus, once mounted, the insulating rings 61, 62 and the chamber bottom 1 define a discharge chamber 63, rotationally symmetrical, delimited by the outer wall 61*a* of the inner ring 61, the inner wall 62*a* of the outer ring 62 and the chamber bottom surface 10 of the chamber bottom 1.

The manufacture of the chamber bottom 1 will now be described with reference to FIG. 5.

The chamber bottom 1 is made of metal by additive manufacturing. In accordance with the general principles of additive manufacturing techniques, the chamber bottom 1 is manufactured layer by layer by partial melting of a metal powder using a high energy beam, such as a laser or an electron beam. Manufacturing takes place in the direction of the main axis A from a manufacturing plate P; the chamber bottom is manufactured from its upper face 3 towards its lower face 4. In the present example, the chamber bottom is made of a nickel-based alloy, for example Inconel 718.

In order to facilitate the manufacture of the chamber bottom 1 by additive manufacturing, sacrificial part portions and/or additional elements such as supports can be added to the target geometry of the final part. In particular, in the present case, the inner 12' and outer 13' walls of the chamber bottom cavity 11' of the blank 1' extend to the distal end of the tabs 31 and 41 in order to be manufactured directly from the production plate P. Additional dummy tabs can also be added, in particular within the second set of tabs 40 in order to reduce the range of the arches 44, thus limiting the angle formed by the latter.

Furthermore, a cylindrical inner shell 71 is manufactured just along the inner tabs 31, without contact, in order to support the latter during manufacture. Such a technique is described in patent application FR 10 55281 of the applicant. Likewise, a cylindrical outer shell 72 is manufactured just along the outer tabs 41, without contact, in order to support the latter during manufacture. The inner 71 and/or outer 72 shells can be sectored to facilitate their removal after manufacture.

Dust removal holes 73 may also be provided in some sacrificial part portions and/or in the shells 71, 72 in order to allow the discharge of the non-solidified powder from the cavities formed during manufacture.

Once the blank 1' is obtained and dedusted, the shells 71, 72 are removed and the blank 1' is positioned on a machining tool using its shoulders 52 and 53 in order to remove the sacrificial portions, in particular the dummy tabs 45, which results in the final chamber bottom 1.

FIG. 6 illustrates a second embodiment of a chamber bottom 101 in which the dummy tabs 145 were not machined. It will be noted on this occasion that the dummy tabs 145 do not have a protrusion at their end and therefore do not interact with the insulating ring.

FIG. 7 illustrates a third exemplary embodiment of a chamber bottom 201 in which the injector 210 only comprises a single distribution cavity 211. In such a case, the first distribution cavity 211 is supplied by the injection channel 223*a* of the injection funnel 223 and directly connected to the chamber bottom cavity 211 by injection orifices 225.

Although the present invention was described with reference to specific embodiments, it is obvious that modifications and changes can be made to these examples without departing from the general scope of the invention as defined by the claims. In particular, individual features of the different illustrated/mentioned embodiments can be combined in additional embodiments. Consequently, the description and the drawings should be taken in an illustrative rather than a restrictive sense.

It is also obvious that all the features described with reference to a method can be transposed, alone or in combination, to a device, and conversely, all the features described with reference to a device can be transposed, alone or in combination, to a method.

The invention claimed is:

1. A plasma thruster having a chamber bottom, the chamber bottom comprising, in a single piece, a chamber bottom surface for closing an annular chamber formed by the chamber bottom and delimited by at least one insulating part attached to the chamber bottom, and at least a first set of tabs comprising fastening tabs for fastening by elastic fitting said at least one insulating part to the chamber bottom, wherein the chamber bottom is made of a metallic material, and wherein at least one fastening tab among the fastening tabs extends axially, beyond the chamber bottom surface in a downstream direction, is elastically deformable and has at its distal end a protrusion configured to cooperate with a notch, a groove or a shoulder of the at least one insulating part; and a second set of tabs.

2. The plasma thruster according to claim 1, wherein the chamber bottom is produced by additive manufacturing.

3. The plasma thruster according to claim 1, wherein the chamber bottom surface has in section a generally U-shaped profile, having at least one point of inflection.

4. The plasma thruster according claim 1, wherein the at least one insulating part comprises a first insulating part and a second insulating part, wherein the first set of tabs is an inner set of tabs, for fastening the first insulating part to the chamber bottom, the second set of tabs are an outer set of tabs, comprising additional fastening tabs for fastening the second insulating part to the chamber bottom.

5. The plasma thruster according claim 1, wherein at least one set of tabs comprises dummy tabs configured so as not to cooperate with said at least one insulating part.

6. The plasma thruster according to claim 1, further comprising at least one distribution cavity communicating with the chamber via injection orifices opening onto the chamber bottom surface.

7. The plasma thruster according to claim 1, comprising a first distribution cavity communicating with a second distribution cavity via a first series of injection orifices, the second distribution cavity communicating with the chamber via a second series of injection orifices.

8. The plasma thruster according to claim 1, wherein the at least one insulating part comprises a first inner insulating ring attached to the chamber bottom by engaging an inner surface of the first inner insulating ring around the first set of tabs.

9. The plasma thruster according to claim 8, wherein the inner surface of the first inner insulating ring is provided with a circular groove, the protrusions of the fastening tabs of the first set of tabs being engaged in the circular groove of the first inner insulating ring and so as to lock a position of the first inner insulating ring.

* * * * *